(12) United States Patent
Busack et al.

(10) Patent No.: US 8,918,261 B2
(45) Date of Patent: Dec. 23, 2014

(54) DYNAMIC PARKING BRAKE METHODS AND SYSTEMS FOR MOTOR VEHICLES

(75) Inventors: Adam Busack, Brighton, MI (US); Eric E. Krueger, Chelsea, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1036 days.

(21) Appl. No.: 12/573,600

(22) Filed: Oct. 5, 2009

(65) Prior Publication Data

US 2011/0082631 A1  Apr. 7, 2011

(51) Int. Cl.
*B60T 8/88* (2006.01)
*B60T 7/02* (2006.01)
*B60T 13/00* (2006.01)
*B60T 7/08* (2006.01)
*B60T 7/04* (2006.01)

(52) U.S. Cl.
CPC ........ *B60T 7/042* (2013.01); *B60T 7/085* (2013.01)
USPC .......... 701/70; 188/158; 188/195; 188/181 T; 188/349; 303/20; 303/122; 303/13; 303/15; 303/9.61

(58) Field of Classification Search
USPC .............. 701/70, 65, 66; 303/20, 123, 127, 7, 303/112, 113.1, 122, 122.15, 13, 15, 155, 303/22.1, 24.1, 3, 6.01, 9.61, 9.62; 188/106 F, 112 R, 158, 181 T, 195, 3 R, 188/349
See application file for complete search history.

(56) References Cited

U.S. PATENT DOCUMENTS

| 4,768,840 | A  | * | 9/1988 | Sullivan et al. ............... 303/6.01 |
| 6,626,271 | B1 | * | 9/2003 | Bohm et al. ................... 188/158 |
| 6,997,521 | B2 | * | 2/2006 | Jensen et al. ....................... 303/3 |
| 7,866,761 | B2 | * | 1/2011 | Gerum et al. ................. 303/9.61 |
| 2010/0252378 | A1 | | 10/2010 | Hilberer |
| 2011/0004386 | A1 | | 1/2011 | Kinder et al. |

FOREIGN PATENT DOCUMENTS

| DE | 102007037346 A1 | 2/2009 |
| DE | 102008012387 A1 | 9/2009 |
| WO | 2009019022 A3 | 5/2009 |

OTHER PUBLICATIONS

German Office Action, dated Mar. 1, 2012, for German Patent Application No. 10 2010 046 846.0.

* cited by examiner

*Primary Examiner* — Adam Tissot
(74) *Attorney, Agent, or Firm* — Ingrassia Fisher & Lorenz, P.C.

(57) ABSTRACT

Various embodiments provide braking systems and methods for a motor vehicle. One braking system includes a primary braking system, a speed sensor, a brake pedal, a parking brake, and a processor coupled to the parking brake and the primary braking system. The processor is configured to engage the primary braking system when the parking brake is activated and the motor vehicle is traveling at a speed at least equal to a pre-determined speed.

18 Claims, 3 Drawing Sheets

DYNAMIC PARKING BRAKE METHODS AND SYSTEMS FOR MOTOR VEHICLES

FIELD OF THE INVENTION

The present invention generally relates to motor vehicles, and more particularly relates to dynamic braking systems for use in motor vehicles.

BACKGROUND OF THE INVENTION

In recent years, advances in technology, as well as ever-evolving tastes in style, have led to substantial changes in the design of automobiles. Some of these changes relate to the complexity of the electrical and drive systems within automobiles, particularly alternative fuel vehicles, such as hybrid, battery electric, and fuel cell vehicles. Such alternative fuel vehicles typically use one or more electric motors, perhaps in combination with another actuator, to drive the wheels.

Other changes relate to improvements in comfort, handling, and safety. For example, many motor vehicles include an electric parking brake that is capable of slowing the motor vehicle during operation and preventing the motor vehicle from moving when the motor vehicle is not operating. When the electric parking brake is actuated (e.g., via a button, lever, etc.), a pull-cable braking system coupled to the rear wheels of the motor vehicle is engaged to decrease the vehicle's speed during operation or prevent movement when parked. When the electric parking brake is actuated while the vehicle is in motion, the manner in which the pull cables decrease the speed of the rear wheels may "lock-up" the rear wheels.

Accordingly, it is desirable to provide a dynamic parking brake method and system for use in motor vehicles. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various embodiments provide a braking system for a motor vehicle having front wheels and rear wheels. One braking system comprises a primary braking system coupled to the front wheels and the rear wheels, a brake pedal coupled to the primary braking system and configured to engage the primary braking system, a parking brake, a speed sensor, and a processor coupled to the parking brake and the primary braking system. The processor is configured to engage the primary braking system when the parking brake is actuated and the motor vehicle is traveling at a speed at least equal to a predetermined speed to slow the vehicle.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
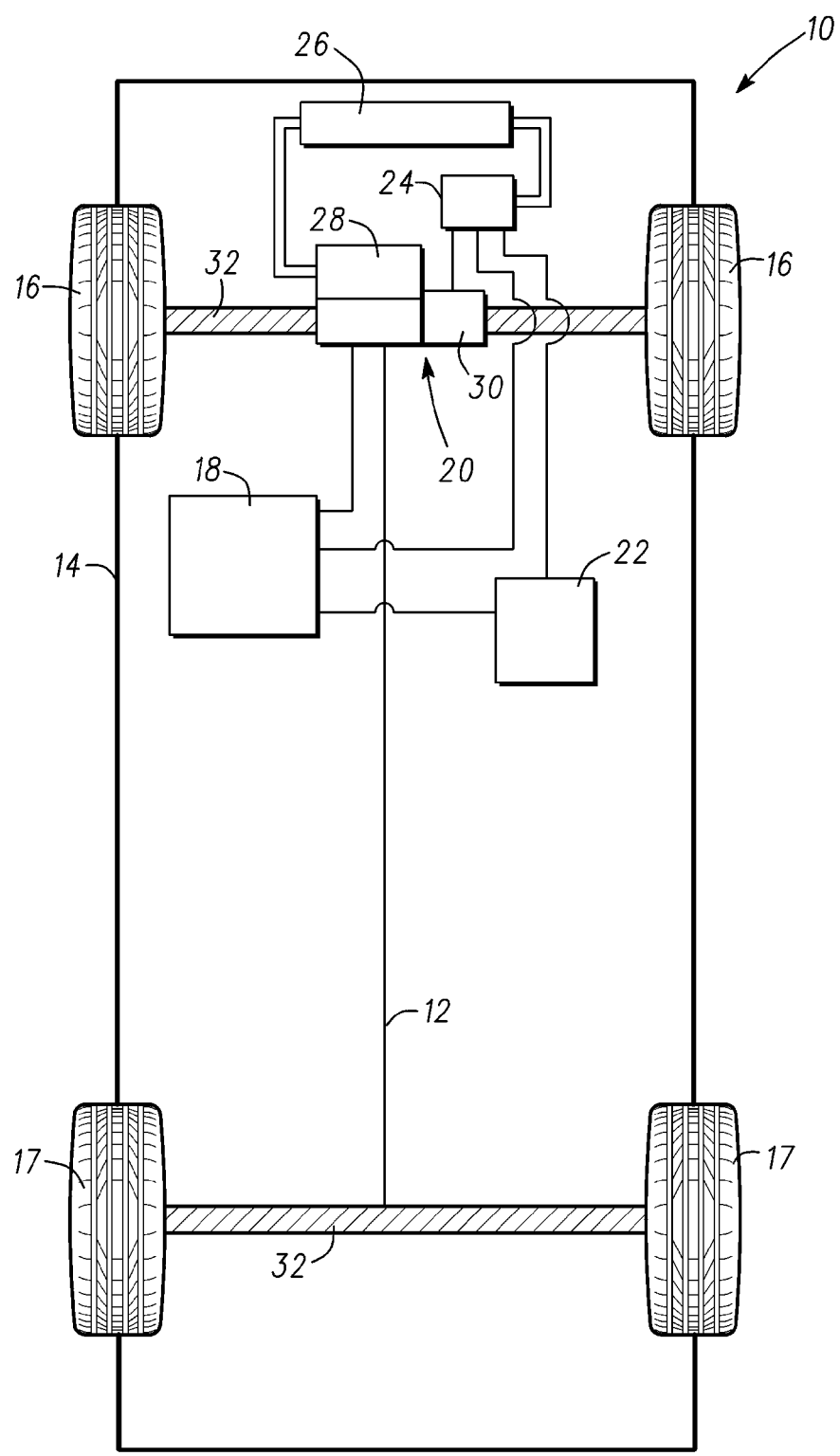
FIG. 1 is a block diagram of a typical hybrid electric vehicle.

FIG. 1 illustrates a vehicle (or "automobile") 10, including a chassis 12, a body 14, front wheels 16, rear wheels 17 and an electronic control system 18. The body 14 is arranged on the chassis 12 and substantially encloses the other components of the automobile 10. The body 14 and the chassis 12 may jointly form a frame. The wheels 16 and 17 are rotationally coupled to the chassis 12 near respective corners of the body 14.

While automobile 10 has been illustrated as a hybrid electric vehicles, automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). Automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor. Automobile 10 further includes an actuator assembly 20, a battery (or a DC power supply) 22, a power converter assembly (e.g., an inverter or inverter assembly) 24, and a radiator 26. The actuator assembly 20 includes a combustion engine 28 and an electric motor/generator (or motor) 30.

Still referring to FIG. 1, the combustion engine 28 and/or the electric motor 30 are integrated such that one or both are mechanically coupled to at least some of the wheels 16 through one or more drive shafts 32. In one embodiment, the automobile 10 is a "series HEV," in which the combustion engine 28 is not directly coupled to the transmission, but coupled to a generator (not shown), which is used to power the electric motor 30.

The radiator 26 is connected to the frame at an outer portion thereof and is coupled to the engine 28 and the inverter 24. Although not illustrated in detail, radiator 26 includes multiple cooling channels therein that contain a cooling fluid (i.e., coolant) such as water and/or ethylene glycol (i.e., "antifreeze").

The electronic control system 18 is in operable communication with the actuator assembly 20, the high voltage battery 22, and the inverter 24. Although not shown in detail, the electronic control system 18 includes various sensors and automotive control modules, or electronic control units (ECUs), such as an inverter control module, a motor controller, and a vehicle controller, and at least one processor and/or a memory which includes instructions stored thereon (or in another computer-readable medium) for carrying out the processes and methods as described below.

Figure 2:
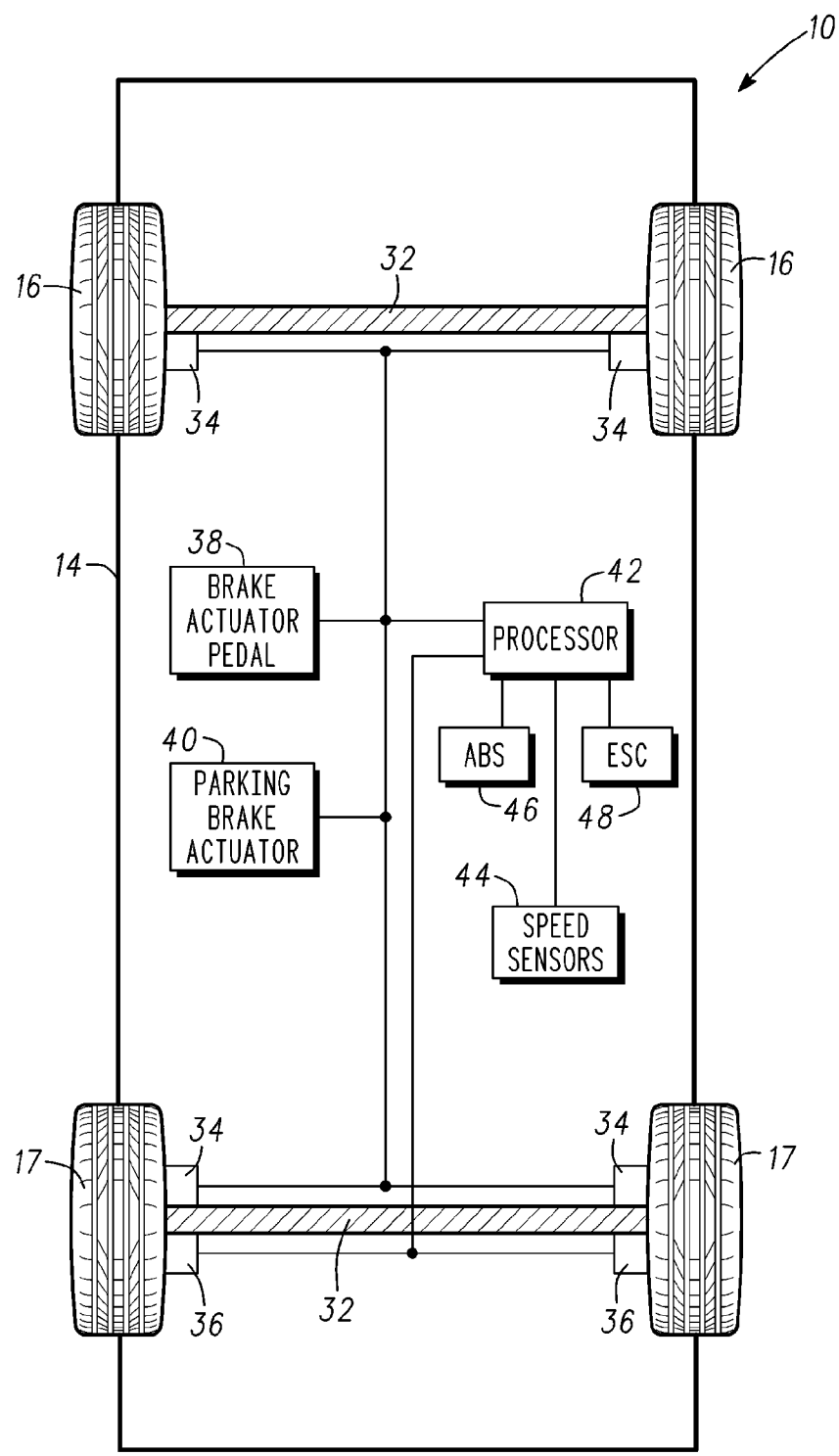
FIG. 2 is a block diagram of a motor vehicle comprising one or more embodiments of a dynamic braking system in accordance with the present invention.

FIG. 2 illustrates motor vehicle 10 equipped with a dynamic braking system in accordance with the present invention. It comprises a primary brake system 34, a secondary brake system 36, a brake actuator or pedal 38, and a parking brake actuator 40, each coupled to a processor 42 as shown.

Primary brake system 34 may comprise any conventional brake system. In one embodiment, primary brake system 34 is coupled to a pair of front wheels 16 and is utilized to slow or stop motor vehicle 10 by applying a braking force to front wheels 16. Primary brake system 34 may comprise an electro-hydraulic brake system having base brake hardware and software. In other embodiments, primary brake system 34 may further comprise an anti-lock brake system (ABS) 46 or an electronic stability control (ESC) system 48. Secondary brake system 36 is coupled to a pair of rear wheels 17 and comprises a pull-cable brake system of the type well known in the art.

Brake pedal 38 may be any known type of brake pedal or similar device and capable of engaging primary brake system 34. Brake pedal 38 may be actuated by a driver of vehicle 10 by depressing brake pedal 38 with the driver's foot. Parking brake actuator 40 may be any device, button, lever, or the like that is used to set or release a parking brake in the known manner.

As discussed above, parking brake actuator 40, brake pedal 38, primary brake system 34, and secondary brake system 36 are coupled to processor 42. In addition, speed sensor 44 is also coupled to processor 42, which may be any processor, processing device, and/or processing system capable of performing the functions described below. Processor 42 is configured to actuate primary brake system 34 when it determines that the driver has applied brake pedal 38. Processor 42 is further configured to monitor the speed of motor vehicle 10 via speed sensor 44 to determine if motor vehicle 10 is traveling at a speed greater than, less than, or substantially equal to a pre-determined speed (e.g., 0-5 kilometers per hour). Processor 42 is also configured to (1) activate secondary brake system 36 when processor 42 detects that the parking brake actuator 40 has been actuated and motor vehicle 10 is traveling below the pre-determined speed, and (2) activate primary brake system 34 when processor 42 detects that the parking brake actuator 40 has been actuated and motor vehicle 10 is traveling at or above the pre-determined speed.

Processor 42 continues to monitor the speed of motor vehicle 10 after processor 42 has activated primary brake system 34 and continues actuating primary brake system 36 while the speed of motor vehicle 10 is at or above the pre-determined speed as long as the parking brake is actuated. Processor 42 is also configured to discontinue activating primary brake system 34 and begin activating secondary brake system 36 when the speed of motor vehicle 10 falls below the pre-determined speed and the parking brake actuator 40 is activated.

Figure 3:
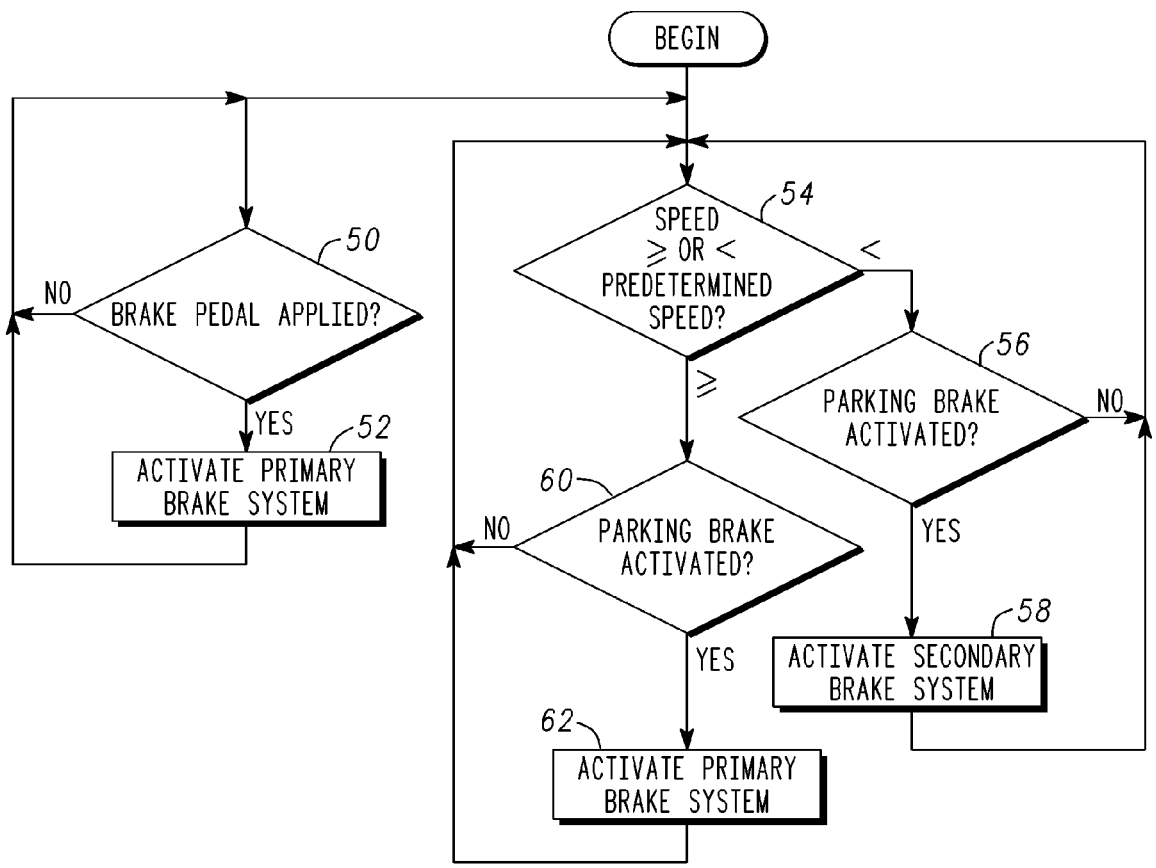
FIG. 3 is a flow chart describing methods for carrying out dynamic braking in accordance with the present invention.

The above described process is illustrated in the flowchart shown in FIG. 3. As can be seen, if processor 42 determines that the brake pedal 38 has been applied (step 50), it will activate the primary brake system 34 (step 52). Should brake pedal 38 be released, the primary brake system 34 will be deactivated. Processor 42 also monitors vehicle speed via speed sensor 44 and determines if the speed is either less than or at least equal to (i.e. equal to or greater than) a predetermined speed. If it is determined that the speed is less than the predetermined speed (step 54) and the parking brake has been activated (step 56), the secondary brake system will be activated (step 58). If processor determines that the vehicle's speed is greater than or equal to the predetermined speed (step 54) and the parking brake has been activated (step 60), the primary brake system will be activated (step 62)

In another embodiment, processor 42 is configured to monitor the ABS system 46 or ESC system 48 to determine if the ABS or ESC system is functioning properly. Processor 42 is further configured to actuate primary brake system 34 on front wheels 16 only if processor 42 detects an unlikely failure in the ABS system 46 or ESC system 48.

Referring again to FIG. 2, primary brake system 34 may also be coupled to rear wheels 17, and is utilized to slow and/or stop motor vehicle 10 via front wheels 16 and rear wheels 17. Similarly, secondary brake system may also be coupled to front wheels 16.

In a further embodiment, processor 42 may be configured to activate primary brake system 34 (and/or secondary brake system) on each of wheels 16 and 17 independently of one another. That is, processor 42 is capable of simultaneously applying different braking amounts to the driver-side front wheel 16, the passenger-side front wheel 16, the driver-side rear wheel 17, and the passenger-side rear wheel 17.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A braking system for a motor vehicle having front wheels and rear wheels, comprising:
    a primary braking system;
    a secondary braking system;
    a vehicle speed sensor;
    a brake pedal;
    a parking brake; and
    a processor coupled to the parking brake, the primary braking system, and the vehicle speed sensor, and configured to:
        engage the primary braking system when the brake pedal is applied;
        engage the primary braking system when the brake pedal is not applied, provided that the parking brake is actuated and the speed of the motor vehicle is at least a pre-determined speed; and
        engage the secondary braking system when the brake pedal is not applied, provided that the parking brake is actuated and the speed of the motor vehicle is less than the pre-determined speed;
    wherein:
        the primary braking system comprises one of an anti-lock brake system (ABS) and an electronic stability control (ESC) system coupled to the front wheels and configured to brake the front wheels when a skid situation is detected; and
        the processor is further configured to detect a failure in the ABS system or the ESC system and apply the primary braking system to the front wheels.

2. The braking system of claim 1, wherein the primary braking system is coupled to the front wheels and the secondary brake system is coupled to the rear wheels.

3. The braking system of claim 2, wherein the primary brake system is also coupled to the rear wheels, and the processor is configured to engage the primary braking system to slow the vehicle by applying a primary braking force to each wheel independently when the brake pedal is not applied, provided that the parking brake is actuated and the speed of the motor vehicle is at least the pre-determined speed.

4. The braking system of claim 1, wherein the primary braking system comprises a base brake system that brakes the front wheels and the secondary braking system comprises a pull cable brake system that brakes the rear wheels.

5. A motor vehicle comprising:
front wheels;
rear wheels;
a primary braking system coupled to the front wheels;
a secondary braking system coupled to the rear wheels;
a parking brake coupled to the secondary braking system, the parking brake configured to activate the secondary braking system;
a sensor for monitoring the speed of the vehicle; and
a processor coupled to the parking brake, the primary braking system, the secondary braking system, and the sensor, wherein the processor is configured to:
engage the primary braking system when the brake pedal is applied;
engage the primary braking system when the brake pedal is not applied, provided that the parking brake is actuated and the speed of the motor vehicle is at least a pre-determined speed; and
engage the secondary braking system when the brake pedal is not applied, provided that the parking brake is actuated and the speed of the motor vehicle is less than the pre-determined speed;
wherein:
the primary braking system comprises one of an anti-lock brake system (ABS) and an electronic stability control (ESC) system coupled to the front wheels and configured to brake the front wheels when a skid situation is detected; and
the processor is further configured to detect a failure in the ABS system or the ESC system and apply the primary braking system to the front wheels.

6. The motor vehicle of claim 5, wherein the primary braking system comprises a base brake system and the secondary brake system comprises a pull cable brake system.

7. The motor vehicle of claim 5, wherein the primary brake system is also coupled to the rear wheels.

8. The motor vehicle of claim 5, wherein the primary brake system is coupled to the rear wheels and the secondary brake system is coupled to the front wheels and the rear wheels.

9. The motor vehicle of claim 8, wherein the secondary braking system is configured to brake the front wheels when a skid situation is detected.

10. The motor vehicle of claim 5 further comprising a brake pedal coupled to the primary braking system and configured to activate the primary braking system.

11. A method for braking a motor vehicle including a primary braking system coupled to at least the front wheels of the vehicle and a secondary braking system coupled to rear wheels of the vehicle, a speed sensor, and a processor coupled to the primary braking system, the secondary braking system, and the speed sensor, the braking system also having a brake pedal and a parking brake actuator, the method comprising the steps of:
determining the speed of the motor vehicle;
engaging the primary braking system when the brake pedal is applied;
engaging the primary braking system when the brake pedal is not applied, provided that the parking brake actuator is applied and the speed of the vehicle is at least equal to a pre-determined speed to slow the vehicle; and
engaging the secondary braking system when the brake pedal is not applied, provided that the parking brake actuator is applied and the speed of the motor vehicle is less than the pre-determined speed;

wherein:
the primary braking system comprises one of an anti-lock brake system (ABS) and an electronic stability control (ESC) system coupled to the front wheels and configured to brake the front wheels when a skid situation is detected; and
the method further comprises detecting a failure in the ABS system or the ESC system and applying the primary braking system to the front wheels.

12. The method of claim 11, further comprising the steps of:
monitoring the speed of the motor vehicle; and
engaging the secondary braking system when the speed decreases from the at least a pre-determined speed to less than the pre-determined speed.

13. The method of claim 1, wherein the processor is configured to:
provide a primary braking force to the front wheels when the brake pedal is applied;
provide the primary braking force to the front wheels when the brake pedal is not applied, provided that the parking brake is actuated and the speed of the motor vehicle is at least a pre-determined speed; and
provide a secondary braking force to the rear wheels when the brake pedal is not applied, provided that the parking brake is actuated and the speed of the motor vehicle is less than the pre-determined speed.

14. The motor vehicle of claim 5, wherein the processor is configured to:
provide a primary braking force to the front wheels when the brake pedal is applied;
provide the primary braking force to the front wheels when the brake pedal is not applied, provided that the parking brake is actuated and the speed of the motor vehicle is at least a pre-determined speed; and
provide a secondary braking force to the rear wheels when the brake pedal is not applied, provided that the parking brake is actuated and the speed of the motor vehicle is less than the pre-determined speed.

15. The motor vehicle of claim 14, wherein the processor is configured to:
provide the primary braking force to each front wheel independently of one another when the brake pedal is not applied, provided that the parking brake is actuated and the speed of the motor vehicle is at least a pre-determined speed; and
provide the secondary braking force to each rear wheel independently of one another when the brake pedal is not applied, provided that the parking brake is actuated and the speed of the motor vehicle is less than the pre-determined speed.

16. The method of claim 11, wherein:
the step of engaging the primary braking system when the brake pedal is applied comprises providing a primary braking force to the front wheels when the brake pedal is applied;
the step of engaging the primary braking system when the brake pedal is not applied comprises applying the primary braking force to the front wheels when the brake pedal is not applied, provided that the parking brake actuator is applied and the speed of the vehicle is at least equal to a pre-determined speed to slow the vehicle; and
the step of engaging the secondary braking system when the brake pedal is not applied comprises applying a secondary braking force to the rear wheels when the brake pedal is not applied, provided that the parking brake actuator is applied and the speed of the motor vehicle is less than the pre-determined speed.

17. The method of claim 11, further comprising:
   determining whether the second braking system is functioning properly; and
   engaging the primary braking system for the front wheels only if it is determined that the secondary braking system is not functioning properly.

18. The braking system of claim 2, wherein the processor is configured to:
   determine whether the second braking system is functioning properly; and
   engage the primary braking system for the front wheels only if it is determined that the secondary braking system is not functioning properly.

* * * * *